United States Patent

[11] 3,556,155

| [72] | Inventors | Orcenith D. McWilliams Morris; John B. Waggoner, Joliet, Ill. |
|---|---|---|
| [21] | Appl. No. | 793,683 |
| [22] | Filed | Jan. 24, 1969 |
| [45] | Patented | Jan. 19, 1971 |
| [73] | Assignee | Caterpillar Tractor Co. Peoria, Ill. a corporation of California |

[54] VARIABLE FLOW-MODULATED VALVE
10 Claims, 3 Drawing Figs.

[52] U.S. Cl.................................................137/625.69,
137/625.3; 251/205; 138/43, 138/46; 267/1
[51] Int. Cl.......................................................F16k 11/07,
F16k 5/10; F15d 1/04
[50] Field of Search............................................ 137/596,
596.1, 596.12, 596.13, 596.14, 596.15, 596.18,
596.2, 625.25, 625.3, 625.48, 625.6, 625.64,
625.66, 625.67, 625.68, 625.69, 625.37; 251/205,
282; 267/1; 138/43, 46

[56] References Cited
UNITED STATES PATENTS

| 2,922,440 | 1/1960 | Hardy et al. | 137/625.68 |
| 2,958,340 | 11/1960 | Rosebrook | 137/625.69 |
| 2,971,536 | 2/1961 | Junck et al. | 251/282 |
| 3,221,770 | 12/1965 | Faisandier | 137/625.68X |
| 3,384,338 | 5/1968 | Dermody | 251/205 |
| 3,410,306 | 11/1968 | Malott | 137/596.2X |
| 3,423,136 | 1/1969 | Lohbauer | 137/625.3X |
| 3,460,577 | 8/1969 | Weathers | 137/625.69 |

FOREIGN PATENTS

| 855,541 | 12/1960 | Great Britain | 251/205 |

Primary Examiner—Henry T. Klinksiek
Attorney—Fryer, Tjensvold, Feix, Phillips & Lempio ABSTRACT: A control valve particularly adapted to vehicle steering by hydraulic pressure wherein source pressure is communicated through slots in a spool valve to a hydraulic steering motor and which slots of various size and configuration are arranged to provide slow or gradual steering upon initial turning of a steering wheel and more rapid steering as turning of the wheel progresses. The slot configuration also insures that the lines in the steering system between the valve and the motor are constantly fully charged with hydraulic fluid to prevent the undesirable results of air in the system.

PATENTED JAN 19 1971  3,556,155
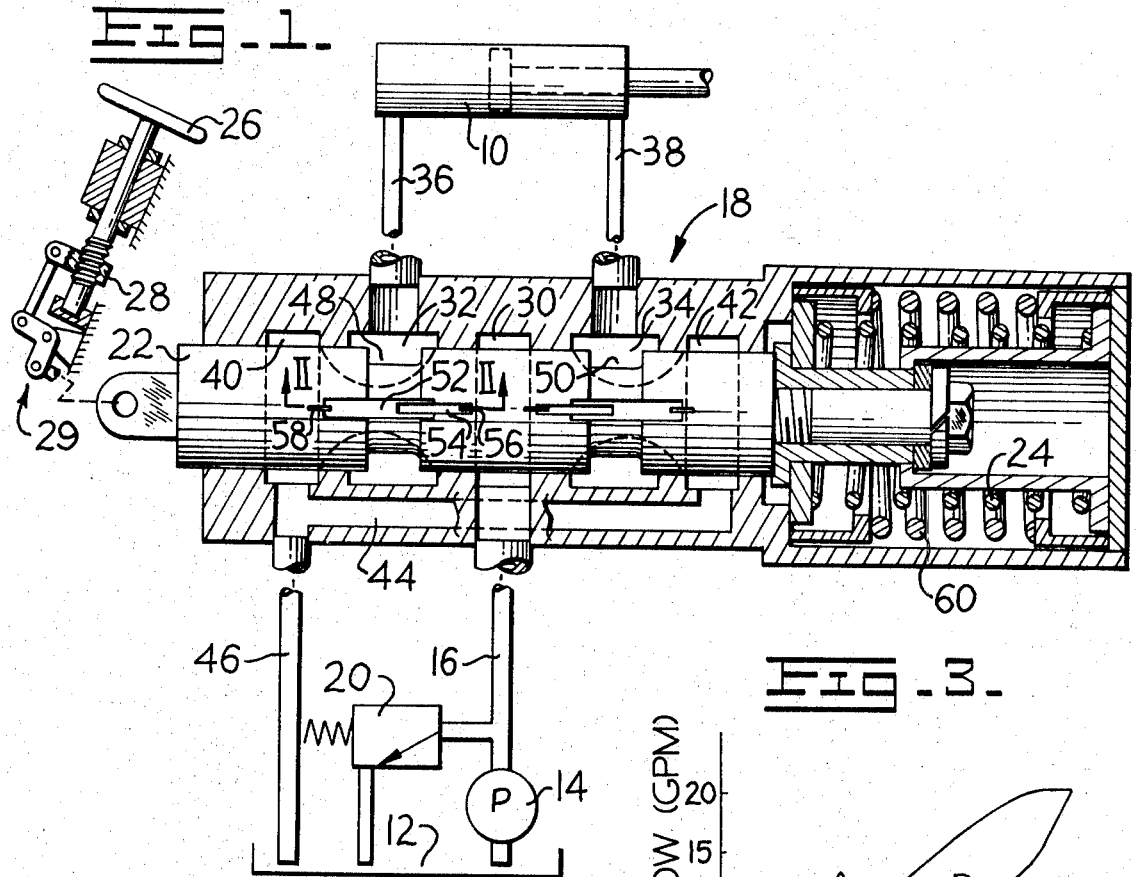
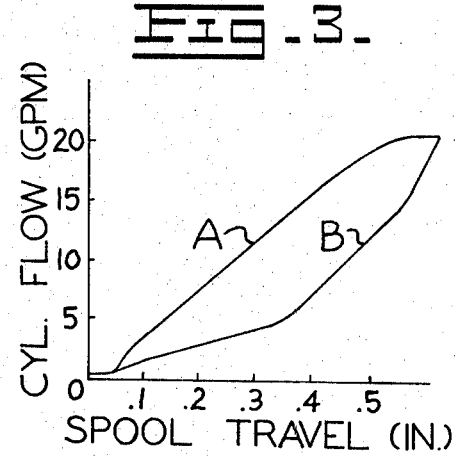
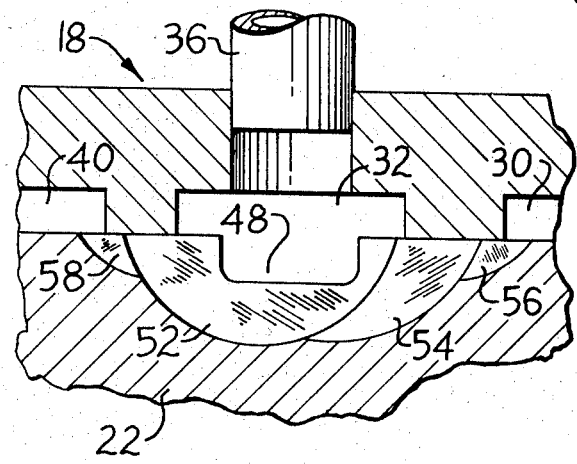
INVENTORS
ORCENITH D. McWILLIAMS
JOHN B. WAGGONER
BY
Fryer, Zimmerold, Felix, Phillips & Lempio
ATTORNEYS

VARIABLE FLOW-MODULATED VALVE

It has been common practice for many years to steer an articulated vehicle such for example as a scraper wherein a two-wheel tractor is pivotally connected to a two-wheel scraper by employing hydraulic jacks between the pivoted sections to cause them to assume an angle with respect to each other for steering purposes.

An example of such steering is disclosed in the Gustafson U.S. Patent No. 2,614,644 which issued on Oct. 21, 1952. In the steering disclosed in the Gustafson Patent, turning of the steering wheel causes opening of a valve to admit pressurized fluid to one end or the other of hydraulic steering jacks depending upon which way the steering wheel is turned. As disclosed in said patent, and in many other steering arrangements, a followup linkage was employed so that angular displacement of the two portions of the vehicle with respect to each other was transferred through the linkage back to the valve to close it. Thus conventional automotive steering was simulated. When the operator turned the steering wheel a given distance the valve was opened to cause steering of the vehicle to a corresponding degree and then the followup linkage closed the valve. Such followup linkage and associated mechanism is expensive, so to reduce cost in certain vehicles and for other reasons a so-called "jerk" steering has been adopted. With this type of steering, movement of a steering wheel opens a valve to direct steering fluid into the hydraulic jack. There is, however, no means for closing the valve except by turning the steering wheel back to its neutral or straight ahead position. Thus the operation of steering requires the driver of the vehicle to turn the steering wheel in the desired direction until the two articulated sections have assumed an intended angle and then turn the steering wheel back to the neutral position. The vehicle will then continue to steer or operate on the arc determined by the angular relationship of the articulated components. When it is desired to reassume a straight course the steering wheel is turned in the opposite direction until the two components are in alignment and then quickly turned back to the neutral position.

The type of steering just described requires that a great deal of fluid be directed to the steering jacks for quickly manipulating the vehicle to the steering jacks for quickly manipulating the vehicle in a sharp turn as when it is working in a borrow pit or in a fill pit, however, this quick or rapid steering is undesirable when the vehicle is travelling rapidly on a straight course or road either loaded or empty between the work pits. Consequently, it is desirable that very rapid steering be possible in a work pit and very slow or gradual steering be available when the vehicle is travelling at high speed on a road in a relatively straight course.

It is common practice in many hydraulic steering arrangements to direct fluid to the opposite ends of steering jacks by means of a spool type valve and it is also common practice to provide a degree of modulation in such valves by providing slots intercepting the reduced portions of the valve stem and communicating fluid to the jacks before the valve is fully opened. The present invention constitutes an improvement on this type of modulation in that it provides slots of different sizes interconnected with each other to accomplish modulation to a much greater degree. Also there are very small slots communicating with the modulated slots for maintaining the steering circuits fully charged with hydraulic fluid to prevent cavitation or air pockets which would result in faulty steering operation. The invention is fully described and will be better understood by reading of the following specification wherein reference is made to the accompanying drawing.

In the drawings:

FIG. 1 is a schematic view of a steering system which embodies the present invention and illustrates particularly the construction of the modulating valve;

FIG. 2 is an enlarged fragmentary sectional view taken along the line II–II of FIG. 1 to show the configuration of the modulating slots; and FIG. 3 is a graph illustrating the difference in steering which results from the present invention as compared to steering with a standard steering valve.

In FIG. 1 of the drawing a jack 10 is shown as typical of a steering jack or jacks of an articulated vehicle. Fluid under pressure drawn from a reservoir 12 by a pump 14 directs fluid toward the jack through a line 16 and a control valve generally indicated at 18. A relief valve 20 communicates between the line 16 and the reservoir to relieve excessive pressure particularly when the valve is in its neutral position shown. A spool 22 is slideable in a suitable bore in the body of the valve 18 and has conventional lands separated by annular recesses cooperating with the recesses and passages in the body of the valve to direct fluid to one end of the steering jacks when the valve spool is moved in one direction and to the other end upon its movement in the opposite direction.

The grooves of the present invention are associated with the annular recesses in the valve spool as will presently be described in connection with FIG. 3. First it should be understood that the valve spool is held in a central or neutral position by a conventional centering spring assembly, the spring of which is shown at 24 in FIG. 1, and the operation and function of which are well known. Movement of the valve spool is caused by turning of the vehicle steering wheel, shown at 26, so that its threaded steering post adjusts a nut 28 upwardly or downwardly thereon and through linkage generally indicated at 29 causes adjustment of spool 22. The body of the valve is provided with a central annular recess 30 to which fluid is directed from the pump. Annular recesses 32 and 34 communicate through lines 36 and 38 respectively to opposite ends of the steering jack and annular recesses 40 and 42 communicate fluid through a passage 44 and a line 46 back to the reservoir. The spool has annular recesses 48 and 50 which normally communicate with the recesses 32 and 34 in the body. Modulating grooves of three different sizes communicate between the recesses 48 and 50 and the body recess 30. These modulating grooves are shown on the left side of the spool, and in FIG. 2, as comprising a relatively large groove 52 a smaller groove 54 intercepting the large groove and extending toward the central groove 30 of the valve. Two smaller grooves 56 and 58 extend, one from the groove 54 to the central recess 30 and the other from the groove 52 to the return recess 40.

In operation, when the steering wheel is turned to cause movement of the valve 22 toward the right, fluid under pressure in the central recess 30 will be directed, as best shown in FIG. 2, through groove 54 and recess 32 to the head end of the jack 10 to cause steering in one direction. During initial movement only the relatively narrow groove 54 communicates with recess 30 and steering is very gradual or slow. However, upon further turning movement of the steering wheel, the larger groove 52 will communicate with the recess 30 and steering will be more rapid. At this time compression of a spring 60 disposed in the chamber of the centering spring will take place and signal to the operator who is turning the steering wheel that a more rapid phase of steering is being undertaken thus providing feel-back in the control. As soon as the desired angle of steering is accomplished the operator will return the wheel to the neutral position and such steering will continue until the wheel is again turned to readjust the valve spool. Steering in the opposite direction is, of course, accomplished by turning the wheel in the opposite direction and the arrangement of grooving associated with recess 34 is identical with that just described.

In order to maintain a full charge of hydraulic fluid under pressure in the lines 36 and 38, and in opposite ends of the jack very small grooves 56 and 58 are in communication, in the neutral position of the valve, with the recesses 30 and 40 respectively. Consequently, pressure is communicated to the lines 36 and 38 and relieved through the recesses 40 and 42 to return to the reservoir. This constant flow of fluid under pressure prevents cavitation in the jack and its associated supply lines which would otherwise occur due to leakage when the valve is in its neutral position.

FIG. 3 illustrates graphically the rate of flow through a conventional steering valve by the line A and through the present valve by the line B. As shown in the drawing with nearly zero movement of the valve from its neutral position, a very small flow is indicated through the small grooves 56 and 58 which prevent cavitation. Then, as movement of the valve spool approaches 0.1 inch, flow gradually increases until upon movement exceeding 0.3 inches the large groove 52 starts to communicate the fluid and the rate of flow increases rapidly.

We claim:

1. A variable flow modulated valve having a body with a bore, an inlet opening communicating with the bore, an outlet opening communicating with the bore and spaced axially from the inlet opening, a spool reciprocably mounted in the bore to close communication between the inlet and outlet openings, said spool having an annular recess arranged to open such communication upon axial adjustment of the spool, and grooves in the spool of varying widths communicating with each other and with the annular recess, said grooves extending axially toward the outlet opening to communicate therewith prior to the annular recess to effect modulated flow through the valve, said spool having a neutral position in the bore with the annular recess being in communication with the outlet opening, said spool being adjustable in the bore from its neutral position for permitting variable fluid flow through the valve, said grooves including a small groove arranged for communication with the inlet opening when the spool is in its neutral position to provide limited fluid communication through the valve for preventing cavitation and a larger groove arranged intermediate said small groove and the annular recess.

2. The valve of claim 1 in which there are two outlet openings spaced axially from the inlet opening in appropriate directions, two annular recesses in the spool each disposed for communication between the inlet opening and one outlet opening and each annular recess having flow modulating grooves extending toward one of the outlet openings.

3. The valve of claim 2 with feel-back spring means operable upon wide opening of the spool in either direction.

4. The valve of claim 1 with resilient means to oppose adjustment of the spool toward the flow position as the annular recess communicates with the outlet opening to transmit feel-back through the spool when it is adjusted manually.

5. The valve of claim 1 further comprising a drain opening communicating with the bore and spaced axially from the outlet opening opposite the inlet opening, said spool being also adjustable in the bore for communicating the outlet opening with the drain opening by means of the annular recess, an additional small groove being in communication with the annular recess and with the drain opening when said spool is in its neutral position.

6. The valve of claim 5 in which there are two outlet openings spaced axially from the inlet opening in appropriate directions and two drain openings spaced axially from the respective outlet openings opposite the inlet opening, two annular recesses with similar groove arrangements being respectively disposed in the spool for communicating one outlet opening with the inlet opening and the adjacent drain opening.

7. The valve of claim 6 further comprising means in communication with the inlet opening to regulate fluid pressure therein.

8. A variable flow modulated valve for operating a double-acting hydraulic jack, the valve having a body with a bore, an inlet opening communicating with the bore, two outlet openings for communicating the valve with opposite ends of the jack, the outlet openings communicating with the bore and being spaced axially from the inlet opening in appropriate directions, a spool reciprocably mounted in the bore to close communication between the inlet and outlet openings, said spool having two annular recesses arranged to respectively open such communication with the outlet openings upon axial adjustment of the spool, each annular recess having an associated arrangement of grooves of varying size formed in the spool in communication with each other and with the associated annular recess, said spool having a neutral position in the bore with the annular recesses being in respective communication with the outlet openings, said spool being adjustable in the bore from its neutral position for permitting variable fluid flow through the valve, each groove arrangement including a small groove arranged for communication with the inlet opening when the spool is in its neutral position and a larger groove arranged intermediate said small groove and the associated annular recess and means in communication with the inlet opening to regulate fluid pressure therein.

9. The valve of claim 8 further comprising two drain openings communicating with the bore in axially spaced apart relation from the respective outlet openings opposite the inlet opening, each groove arrangement including an additional small groove being in communication with the annular recess and with the drain opening when said spool is in its neutral position.

10. The valve of claim 9 further comprising centering spring means tending to maintain the spool in its neutral position and feedback spring means tending to resist further adjustment of the spool upon either of the annular recesses entering into direct communication with the inlet opening.